United States Patent
Pickford

(10) Patent No.: US 6,613,370 B1
(45) Date of Patent: Sep. 2, 2003

(54) BREADCRUMB COATING FOR FOOD PRODUCTS

(75) Inventor: Keith Pickford, Manchester (GB)

(73) Assignee: Novus Foods Ltd., Manchester ( * ) Notice: Subject to any disclaimer, the term of this patent is extended or adjusted under 35 U.S.C. 154(b) by 0 days.

(21) Appl. No.: 09/646,068

(22) PCT Filed: Mar. 3, 1999

(86) PCT No.: PCT/GB99/00564

§ 371 (c)(1),
(2), (4) Date: May 3, 2001

(87) PCT Pub. No.: WO99/44439

PCT Pub. Date: Sep. 10, 1999

(30) Foreign Application Priority Data

Mar. 3, 1998 (GB) ............................................. 9804347

(51) Int. Cl.[7] .............................................. A23L 1/176

(52) U.S. Cl. ........................... 426/94; 426/96; 426/289; 426/302; 426/516

(58) Field of Search ........................ 426/94, 289, 302, 426/96, 516

(56) References Cited

U.S. PATENT DOCUMENTS

| 4,308,286 A | * | 12/1981 | Anstett et al. ................. 426/19 |
| 5,049,711 A | * | 9/1991 | August ....................... 426/243 |
| 5,492,707 A | * | 2/1996 | Chalupa et al. ............. 426/302 |

FOREIGN PATENT DOCUMENTS

| EP | 0017338 | * | 10/1980 |
| WO | WO 95/23523 | * | 9/1995 |

* cited by examiner

Primary Examiner—Lien Tran
(74) Attorney, Agent, or Firm—Beyer Weaver & Thomas LLP

(57) ABSTRACT

Provided are methods of manufacturing breadcrumb and a breadcrumb coated food product. The method of manufacture of breadcrumb involves contacting a flour mixture with an aqueous solution of a gelling agent and a bleaching agent, allowing the solution to be absorbed by the mixture to form a slurry, extruding the slurry to form pellets, and drying and milling the pellets to form breadcrumb. The method of manufacture of a breadcrumb coated food product involves contacting a breadcrumb with an aqueous solution of a gelling agent, allowing the solution to be absorbed by the crumb, drying the crumb and applying the crumb as a coating to a food substrate.

9 Claims, No Drawings

BREADCRUMB COATING FOR FOOD PRODUCTS

This invention relates to a breadcrumb for use in coating food products, particularly but not exclusively for food products which are frozen for storage before use. Particularly preferred breadcrumb coatings are suitable for cooking or reheating from the frozen state using a microwave oven.

The invention also relates to breadcrumb coated food products which may be cooked or reheated using a microwave oven.

Commercially produced breadcrumb may be derived from two processes.

Real breadcrumb is derived from bread baked in a traditional manner and subsequently dried. The bread is then comminuted to form crumb particles of a variety of sieve sizes and dried as required for various coating applications.

In the electrolytic process bread is baked without using yeast in a similar way to unleavened bread and then dried. The bread may be formed as blocks or pellets and then comminuted to form crumbs of various sizes which are then dried. This kind of bread can form flakes. Such flakes are commonly referred to as Japanese style crumb.

Commercially produced breadcrumbs may deteriorate and become stale after three to six months due to the effects of moisture, microbial damage and a breakdown in the molecular structure of the crumb. This staling manifests itself as a toughness and chewiness of the crumb and may be accompanied by off-flavours. The presence of water is a key factor in this deterioration process.

When commercial breadcrumb is applied to a food substrate such as fish, meat, dairy products, vegetables or fruit followed by flash frying, a crisp coated product may be produced, irrespective of the quality of the crumb prior to frying. However the fried crumb will deteriorate over time during chilled or frozen storage, despite the fact that the oil introduced during frying acts as a moisture barrier. The rate of deterioration may depend on the quality of crumb used. If a chilled or frozen fried crumb product is heated from frozen using a microwave oven this results in a crumb which is wet and soggy and therefore unpalatable.

Problems due to crumb deterioration lead to an inconsistent end product which does not have a sufficient predetermined shelf life. Variation in the quality of the crumb can lead to a breakdown of the crumb particles causing an excess build up of fine particles resulting in poor coating quality.

Bread has a porous open lattice structure which readily dries out but also readily absorbs moisture. Past attempts to create moisture barriers in bread have involved the use of lipids or carbohydrates. Large amounts of lipids cannot be used since the overall integrity of the crumb would be lost. In addition water may bypass lipid components and still be absorbed into the bread structure. Addition of carbohydrates in the form of sugars or starches has been found to compound this problem.

According to a first aspect of the present invention a method of manufacture of a bread crumb coated food product comprises the steps of contacting a bread crumb with an aqueous solution of a gelling agent, allowing the solution to be absorbed by the crumb, drying the crumb and applying the crumb as a coating to a food substrate.

According to a second aspect of the present invention there is produced a breadcrumb coated food product comprising a substrate coated with breadcrumb impregnated with a gelling agent by a method in accordance with the first aspect of this invention.

According to a third aspect of this invention there is provided use of a method in accordance with the first aspect for manufacture of a food product which may be cooked or reheated using a microwave oven.

The breadcrumb is preferably formed by extrusion but can also be formed by an electrolytic process. Use of Japanese style crumb is especially preferred.

The gelling agent may be a hydrocolloid. A variety of gums may be employed, for example arabic, tragacanth, karaya and ghatti. Use of guar gum or locust bean gum is especially preferred. Mixtures of hydrocolloids may be employed.

Alternative hydrocolloids include plant extracts, for example pectins, arabinogalacton, psyllium seed, quince seed, agar, alginates, carrageenan gum and furcellaran gum.

Gelatin, albumin, casein or soy protein may also be used.

Cereal starches which may be used include corn, wheat, rice, waxy maize, sorghum, waxy sorghum and other seed starches. Tuber starches including potato, arrowroot and tapioca may also be employed.

Modified gums and cellulose derivatives for example carboxymethyl cellulose, methyl cellulose, hydroxypropyl methyl cellulose, methyl ethyl cellulose and hydroxypropyl cellulose may also be employed.

Low methoxy pectin and microbial fermentation gums for example dextran and xanthan gum may also be used.

Propyl glycol aginate, pre-gelatinised starches and modified starches, for example carboxymethyl starch, hydroxymethyl starch and hydroxypropenol starch may also be used.

Food grade synthetic gums be also be employed.

Gums, especially guar gum and locust bean gum may be present at a concentration from a trace to 3% by weight, preferably 1.5%, more preferably 1% by weight. A small amount of xanthan gum may also be employed, eg 0.1% to 0.75%.

Mixtures of two or more of any of the aforementioned gums may be used.

The gum in accordance with this invention may be applied to a variety of food substrates including chicken, fish, cheese and vegetable. The substrate may be treated beforehand with a stabiliser composition as disclosed in WO97/03572, the disclosure of which specification is incorporated herein by reference.

The breadcrumb used in the invention may be manufactured by any conventional process, for example an extrusion and drying process. The dough may be made from a wide variety of flours although wheat or maize flours are preferred, hard wheat flour being especially preferred. Emulsifying lipids of animal or vegetable sources, for example stearates may be used and sweeteners, for example dextrose and raising agents for example sodium bicarbonate may be added. Ammonium phosphate may be added to improve the whiteness of the product.

In preferred embodiments of the invention the gum, for example guar gum or locust bean gum is combined with sodium metabisulphite in the solid phase prior to addition to the crumb. The bisulphite serves to sterilise the gum (which is of natural origin and therefore may contain bacteria) and assists in carrying the gum into solution. The metabisulphite also serves to bleach the crumb to give an enhanced lighter colour.

The coating may be formulated according to WO96/32026, the disclosure of which specification is incorporated herein by reference, eg Example 16.

The invention is further described by means of example but not in any limitative sense.

EXAMPLE 1

Guar gum having a viscosity in the viscosity band 3000 cps was hydrated at 1% using a high shear mixer. The mixture was allowed to stand for 24 hr to form a clear gel. 400 g of the gel were added to 1 kg of Japanese style crumb and thoroughly mixed. The gel readily dispersed in the crumb which became damp and easily manageable. The crumb was dried for 48 hr at 60° C. The resulting crumb was slightly darker than the original and was very crisp.

Water resistant properties were tested by taking a small sample of the original crumb and putting it into beaker of water. This was compared with the guar gum impregnated crumb which was also added to a beaker of water. The original sample floated and then within seconds absorbed water, swelling and becoming pasty. The guar gum coated crumb sank when removed from the water and after a few minutes was still crisp showing that the coated crumb exhibited moisture resistance.

EXAMPLE 2

Crumb was prepared using hard wheat flour, an emulsifier, sweetener eg dextrose and a raising agent eg sodium bicarbonate. Water containing the gelling agent was added in an amount of 0.25 to 0.32% relative to the weight of flour.

The stabilising additive comprised guar gum of the viscosity range of 3000 to 3500 cp mixed in the ratio of 66% guar gum to 34% metabisulphite. The mixture was hydrated to give a solution containing 2% to 3% by weight of solids in a viscous slurry. The hydrated slurry was pumped into an extruder at a rate of 1.5 to 2 kg of hydrated additive to 8.5 kg of flour mixture.

Pellets 2 to 3 cm in length and approximately 1 cm in diameter were discharged from the extruder head. The pellets were then dried in a continuous drier having a length of about 100 m comprising a series of interlinked drying chambers. The pellets were discharged completely dry and were then milled to give a crumb of a desired mesh size eg 250 to 750 mesh.

The crumb was applied to a substrate eg whole muscle pork, beef, chicken or fish which had been stabilised as disclosed in WO97/03572. The coated product was then fried and nitrogen frozen.

In an alternative process a comminuted meat or fish substrate was treated with a stabiliser as disclosed in WO97/03572, a pre-dust applied followed by batter and a crumb with a mesh size above 2 to 3 mm. The coated product was fried and frozen.

It is preferred that the oil used for frying has a free fatty acids content below 0.5%. The oil should also not be polymerised due to the presence of carbon contaminants or trace metals.

What is claimed is:

1. A method of manufacture of breadcrumb, the method comprising:
    preparing a mixture comprising flour and an aqueous solution comprising 66% guar gum gelling agent and 34% sodium metabisulphite bleaching agent;
    hydrating the mixture to form a slurry;
    extruding the slurry to form pellets; and
    drying and milling the pellets to form breadcrumb.

2. A method of manufacture of breadcrumb, the method comprising:
    preparing a mixture comprising
        flour, and
        an aqueous solution of a gelling agent selected from the group consisting of cereal starches selected from corn, wheat, rice, waxy maize, sorghum, waxy sorghum, potato, arrowroot and tapioca starches and mixtures thereof, and a bleaching agent;
    hydrating the mixture to form a slurry;
    extruding the slurry to form pellets; and
    drying and milling the pellets to form breadcrumb.

3. A method of manufacture of breadcrumb, the method comprising:
    preparing a mixture comprising
        flour, and
        an aqueous solution of a gelling agent selected from the group consisting of carboxymethylcellulose, methylcellulose, hydroxypropylmethylcellulose, methylethylcellulose, hydroxypropylcellulose and mixtures thereof, and a bleaching agent;
    hydrating the mixture to form a slurry;
    extruding the slurry to form pellets; and
    drying and milling the pellets to form breadcrumb.

4. A breadcrumb coated food product comprising a substrate coated with a breadcrumb impregnated with a gelling agent and a bleaching agent by a method in accordance with claim 1.

5. A method of preparing a food product, comprising:
    coating the food product with a breadcrumb manufactured in accordance with claim 1; and
    cooking or reheating the food product using a microwave oven.

6. A breadcrumb coated food product comprising a substrate coated with a breadcrumb impregnated with a gelling agent and a bleaching agent by a method in accordance with claim 2.

7. A method of preparing a food product, comprising:
    coating the food product with a breadcrumb manufactured in accordance with claim 2; and
    cooking or reheating the food product using a microwave oven.

8. A breadcrumb coated food product comprising a substrate coated with a breadcrumb impregnated with a gelling agent and a bleaching agent by a method in accordance with claim 3.

9. A method of preparing a food product, comprising:
    coating the food product with a breadcrumb manufactured in accordance with claim 3; and
    cooking or reheating the food product using a microwave oven.

* * * * *